United States Patent [19]

Pavlath et al.

[11] Patent Number: 5,598,489
[45] Date of Patent: Jan. 28, 1997

[54] DEPOLARIZED FIBER OPTIC ROTATION SENSOR WITH LOW FARADAY EFFECT DRIFT

[75] Inventors: George A. Pavlath, Thousand Oaks; Ronald J. Michal, Wrightwood; Ralph A. Patterson, Canoga Park; Sidney X. Y. Huang, West Hills, all of Calif.

[73] Assignee: Litton Systems, Inc., Woodland Hills, Calif.

[21] Appl. No.: 281,339

[22] Filed: Jul. 27, 1994

[51] Int. Cl.$^6$ .................................................. G02B 6/00
[52] U.S. Cl. ................. 385/12; 250/227.19; 250/227.27; 356/350
[58] Field of Search ................................. 385/11, 12, 13, 385/14, 15, 129; 250/227.19, 227.27; 356/350

[56] References Cited

U.S. PATENT DOCUMENTS

| | | | |
|---|---|---|---|
| 4,255,018 | 3/1981 | Ulrich et al. | 385/125 X |
| 5,051,577 | 9/1991 | Lutz et al. | 250/227.17 |
| 5,063,290 | 11/1991 | Kersey | 250/227.17 |
| 5,115,480 | 5/1992 | Large | 385/12 |
| 5,208,652 | 5/1993 | Sonobe et al. | 385/12 X |
| 5,270,538 | 12/1993 | Vali et al. | 385/12 X |
| 5,327,214 | 7/1994 | Asami | 385/12 X |
| 5,355,216 | 10/1994 | Kim et al. | 385/12 |

OTHER PUBLICATIONS

K. Hotate et al., "Drift of an Optical Fiber Gyro Caused by the Faraday Effect: Influence of the Earth's Magnetic Field", Applied Optics, 25 (1986) 1086–1092.

Primary Examiner—Akm E. Ullah
Attorney, Agent, or Firm—Lynn & Lynn

[57] ABSTRACT

A fiber optic sensing coil formed in a polarization-maintaining optical fiber has two optical fiber leads extending therefrom. A multifunction integrated optics chip linearly polarizes optical signals input to the sensing coil. Fiber optic leads formed of polarization-maintaining optical fiber extend from the multifunction integrated optics chip. The fiber optic multifunction integrated optics chip leads are arranged such that the linear polarization of optical signals output from the multifunction integrated optics chip is directed along one of the principal axes of birefringence of each of the fiber optic multifunction integrated optics chip leads. Splices are formed between corresponding the first sensing coil leads and the multifunction integrated optics chip leads. The sensing coil leads and the multifunction integrated optics chip leads are arranged such that their corresponding principal axes of birefringence are at angles of approximately 45° relative to one another. The first splice is formed a distance from the multifunction integrated optics chip such that a selected phase change between polarization components occurs in optical waves that propagate the distance $L_1$ in the first multifunction integrated optics chip lead.

6 Claims, 3 Drawing Sheets

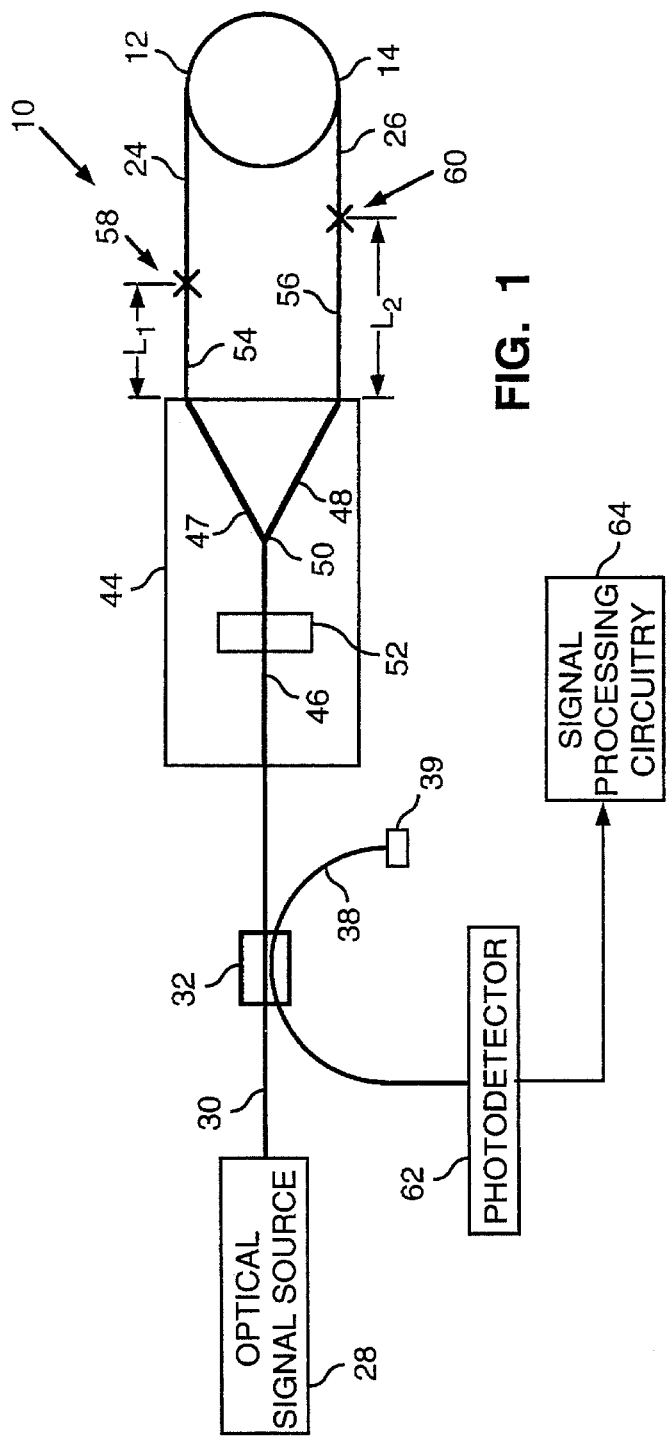
FIG. 1
FIG. 5
FIG. 4

1

DEPOLARIZED FIBER OPTIC ROTATION SENSOR WITH LOW FARADAY EFFECT DRIFT

BACKGROUND OF THE INVENTION

This invention relates generally to Sagnac effect rotation sensors and particularly to rotation sensors that sense rotation-induced phase differences between counterpropagating waves in a fiber optic sensing coil. Still more particularly, this invention relates to apparatus and methods for reducing bias errors caused by the Faraday effect in a fiber optic rotation sensor.

A fiber optic rotation sensor uses the Sagnac effect in a coil of optical fiber to detect rotations about a sensing axis that is perpendicular to the plane of the coil. Counterpropagating light waves in the sensing coil experience a phase shift that is related to the rotation rate. The phase shift is seen as a change in the interference pattern the waves make when they are combined. The interference pattern is produced when two waves of the same polarization have traversed the fiber optic sensing coil in opposite directions and then interfere. The interference pattern may be monitored by directing it onto a photodetector, which produces an electrical signal indicative of the intensity of the light in the interference fringe pattern.

It has been found that using low birefringence optical fiber, which preserves the polarization of optical signals propagating therein, and a depolarizer prevents signal fading, which is characteristic of fiber optic rotation sensors formed of low birefringence optical fiber. When a depolarizer is included in a fiber optic rotation sensor formed of high birefringence optical fiber, polarized light is split between the two orthogonal states which coincide with the principal axes of birefringence. This insures that half the light will reach the detector. A system with a perfect depolarizer will have a near zero percent degree of polarization.

Non-reciprocal phase shifts in fiber optic rotation sensors occur as a result of magnetic fields applied to the optical fiber. Magnetic fields interact with light guided by the optical fiber via the Faraday effect, which rotates the plane of polarization of the light waves. A bias uncertainty of 10 degrees has been reported to be caused by interaction between the earth's magnetic field and the light waves in a fiber optic rotation sensor. This bias uncertainty causes errors in measurements of rotations made with a fiber optic rotation sensor.

The rotation angle due to the Faraday effect is given by the product of the magnetic field intensity, the fiber length and the Verdet constant of the glass optical fiber. If a perfect, non-birefringent optical fiber is wrapped in a closed path, such as in the sensing coil of a fiber optic rotation sensor, the line integral of the magnetic field is zero according to Ampere's law because there is no current enclosed by the path. Therefore, the net rotation angle due to the Faraday effect is zero for such fibers.

The line integral of the magnetic field is zero only for a perfect fiber without internal or externally-induced birefringence. Real optical fiber typically has one or more types of birefringence. Fiber twist in a fiber optic sensing coil is one source of birefringence. Fiber twist can occur in the optical fiber during manufacturing or as a result of the coil winding process. Fiber twist in the fiber optic rotation sensor coil acts as an unavoidable phase retarder that, together with an external magnetic field, causes bias drift due to the Faraday effect. In a fiber optic rotation sensor coil, the presence of the magnetic field and the retarders results in a net bias shift between the counterpropagating waves.

Many fiber optic rotation sensor applications require an inertial measurement unit that is light in weight and low in cost. One of the many approaches for accomplishing this objective is to attempt to minimize the amount of magnetic shielding needed to reduce the fiber optic rotation sensor sensitivity to magnetic fields.

Several models have developed to describe the effects of magnetic fields on fiber optic rotation sensors. The early models provided a qualitative explanation linking twist in the fiber, birefringence of the fiber, the polarization states of the light beams propagating through the fiber and magnetic fields with the observed non-reciprocal behavior of the fiber optic Sagnac interferometer. These models provide that in order for a magnetic field to interact with a light beam traveling in a fiber, the propagation direction of the light beam and the direction of the magnetic-field must have components that are parallel. It was inferred that only transverse magnetic fields will interact with fiber optic rotation sensor coils.

However, it has been found that the fiber optic rotation sensor is sensitive to both transverse and axial magnetic fields. It is to be understood that a transverse field is in the plane of the fiber coil and that an axial field is perpendicular to the plane of the fiber coil. When the magnetic field is parallel to the coil rotation input axis, its component along the fiber axis is very small because the fiber turns have a very small projection onto the coil axis. Therefore, this field should result in a small or negligible bias drift due to the Faraday effect. Nevertheless, it has been experimentally found that many fiber optic rotation sensor coils exhibit axial magnetic field sensitivities as large or larger than their transverse sensitivities.

Compensation of the fiber gyro sensitivity to magnetic fields has been proposed previously by using a simple twisting of the fiber. This approach provides only limited compensation because it does not take into account all the variables necessary to compensate both transverse and axial fields.

Another prior art technique for reducing bias errors caused by the Faraday effect is to place the sensing coil inside a housing formed of a metal having a high magnetic permeability. The housing shields the optical fiber from magnetic fields external to the housing. Metal shields have the disadvantages of increasing both the cost and weight of the fiber optic rotation sensor. Therefore, there is a need in the art for a low cost technique for reducing bias errors caused by the Faraday effect in a fiber optic rotation sensor without adding appreciably to the weight of the rotation sensor system.

SUMMARY OF THE INVENTION

The present invention is directed to a simple and low cost approach to suppressing sensitivity to both axial and transverse magnetic fields in a fiber optic rotation sensor that has a sensing coil formed of a high birefringence fiber.

A fiber optic rotation sensor according to the present invention that senses rotations about the axis of a sensing coil (axial direction) in a length of an optical fiber by detecting phase differences in a pair of counterpropagating waves in the sensing coil comprises first and second sensing coil leads of polarization maintaining optical fiber extending from the sensing coil. Each of the first and second sensing coil leads have two mutually perpendicular principal axes of birefringence. An optical source produces light waves that form clockwise and counterclockwise propagating optical beams in the sensing coil.

The light from the source is introduced into the Multi-Functioned Integrated Optic Chip (MIOC). The MIOC includes a polarizer, a beamsplitter and a phase modulator. The light that enters the MIOC is first polarized. The polarized light is then split by the beamsplitter into two beams of light of equal intensity. These beams of light are then modulated by the phase modulator. These beams of light are then coupled into two fiber optic leads that are pigtailed to the MIOC. The first and second fiber optic leads exiting the MIOC are formed of polarization maintaining optical fiber. The optical fiber leads each have two mutually perpendicular principal axes of birefringence. The first and second exiting fiber optic leads are pigtailed to the MIOC such that the axes of birefringence is oriented both perpendicular and parallel to the polarization state defined by the polarizer. The polarized light exits the MIOC through the fiber leads such that the polarized light is directed parallel to the appropriate axis of birefringence.

A first splice is formed between the first sensor coil lead and the first fiber lead exiting the MIOC. The first sensing coil lead and the first exiting lead from the MIOC are arranged such that their corresponding principal axes of birefringence are at angles close to 45 degrees relative to one another such that the clockwise wave in the sensing coil is depolarized. The first exiting lead has a length Lo between the MIOC exiting port and the first splice. A second splice is formed between the second sensing coil lead and the second MIOC exiting lead a distance L2 from the MIOC with the second MIOC exiting lead being arranged such that their corresponding principal axes of birefringence are at angles of 45 degrees relative to one another such that the counterclockwise wave in the sensing coil is depolarized. By arranging the first and second splices at 45° it has been shown experimentally that a the sensitivity of the fiber sensing coil to transverse magnetic fields is reduced. It has been further shown analytically that the distances Lo and L2 can be adjusted such that both transverse and axial magnetic sensitivity of the sensing coil can be reduced. It has also been shown that the technique for reducing sensitivity to l magnetic fields by using two 45 degree splices can be used in conjunction with a twist compensation technique. These two compensation techniques can be used together to reduce both transverse and axial sensitivity. Lastly it has been shown that splice locations $L_1$ and $L_2$ can be adjusted such that transverse magnetic sensitivity can be reduced while axial magnetic sensitivity is amplified. This provides a means for measuring the magnetic field along one direction.

A fiber optic rotation sensor according to the present invention that senses rotations about the axis of a sensing coil formed in a length of an optical fiber by detecting phase differences in a pair of counterpropagating waves in the sensing coil comprises first and second sensing coil leads of polarization-maintaining optical fiber extending from the sensing coil. Each of the first and second sensing coil leads have two mutually perpendicular principal axes of birefringence. An optical signal source produces optical signals that form clockwise and counterclockwise propagating optical waves in the sensing coil.

A polarizer linearly polarizes the optical signals from the optical signal source. First and second fiber optic multifunction integrated optics chip leads extend from the multifunction integrated optics chip. The first and second fiber optic multifunction integrated optics chip leads are formed of polarization-maintaining optical fiber. Each of the first and second fiber optic multifunction integrated optics chip leads has two mutually perpendicular principal axes of birefringence. The first and second fiber optic multifunction integrated optics chip leads are arranged relative to the multifunction integrated optics chip such that the linear polarizations of the optical signals output from the multifunction integrated optics chip are directed along one of the principal axes of birefringence of each of the first and second fiber optic multifunction integrated optics chip leads.

A first splice is formed between the first sensing coil lead and the first multifunction integrated optics chip lead. The first sensing coil lead and the first multifunction integrated optics chip lead are arranged such that their corresponding principal axes of birefringence are at angles of approximately 45° relative to one another such that the counterclockwise wave in the sensing coil is depolarized. The first multifunction integrated optics chip lead has a length $L_1$ between the multifunction integrated optics chip and the first splice such that a first selected phase change between polarization components occurs in optical waves that propagate the distance $L_1$ in the first multifunction integrated optics chip lead. A second splice is formed between the second sensing coil lead and the second multifunction integrated optics chip lead a distance $L_2$ from the multifunction integrated optics chip with the second sensing coil lead and the second multifunction integrated optics chip lead being arranged such that their corresponding principal axes of birefringence are at angles of approximately 45° relative to one another such that the counterclockwise wave in the sensing coil is depolarized.

The present invention also provides apparatus for producing a signal indicative of the strength of an magnetic field on a fiber optic coil that comprises apparatus for introducing counterpropagating optical signals in the sensing coil such that an external magnetic field on the sensing coil causes a phase difference between the counterpropagating optical signals as they traverse the sensing loop via the Faraday effect. The magnetic field sensor includes apparatus for reducing the sensitivity of the phase of the counterpropagating optical signals to magnetic fields transverse to the sensing coil and apparatus for monitoring interference patterns caused by combination of the counterpropagating optical signals to produce signals indicative of the strength of an external magnetic field directed along the axis of the sensing coil.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 1 illustrates a depolarized fiber optic rotation sensor according to the present invention that includes a multifunction integrated optics chip formed on a multi-function integrated optics chip and having fiber optic leads that spliced to a pair of fiber optic leads that extend from a fiber optic sensing coil;

FIG. 4 is an end view of a polarization-maintaining optical fiber showing principal axes of birefringence; and FIG. 5 is a side elevation view of the polarization-maintaining optical fiber of FIG. 4.

DESCRIPTION OF THE PREFERRED EMBODIMENT

Figure 2:
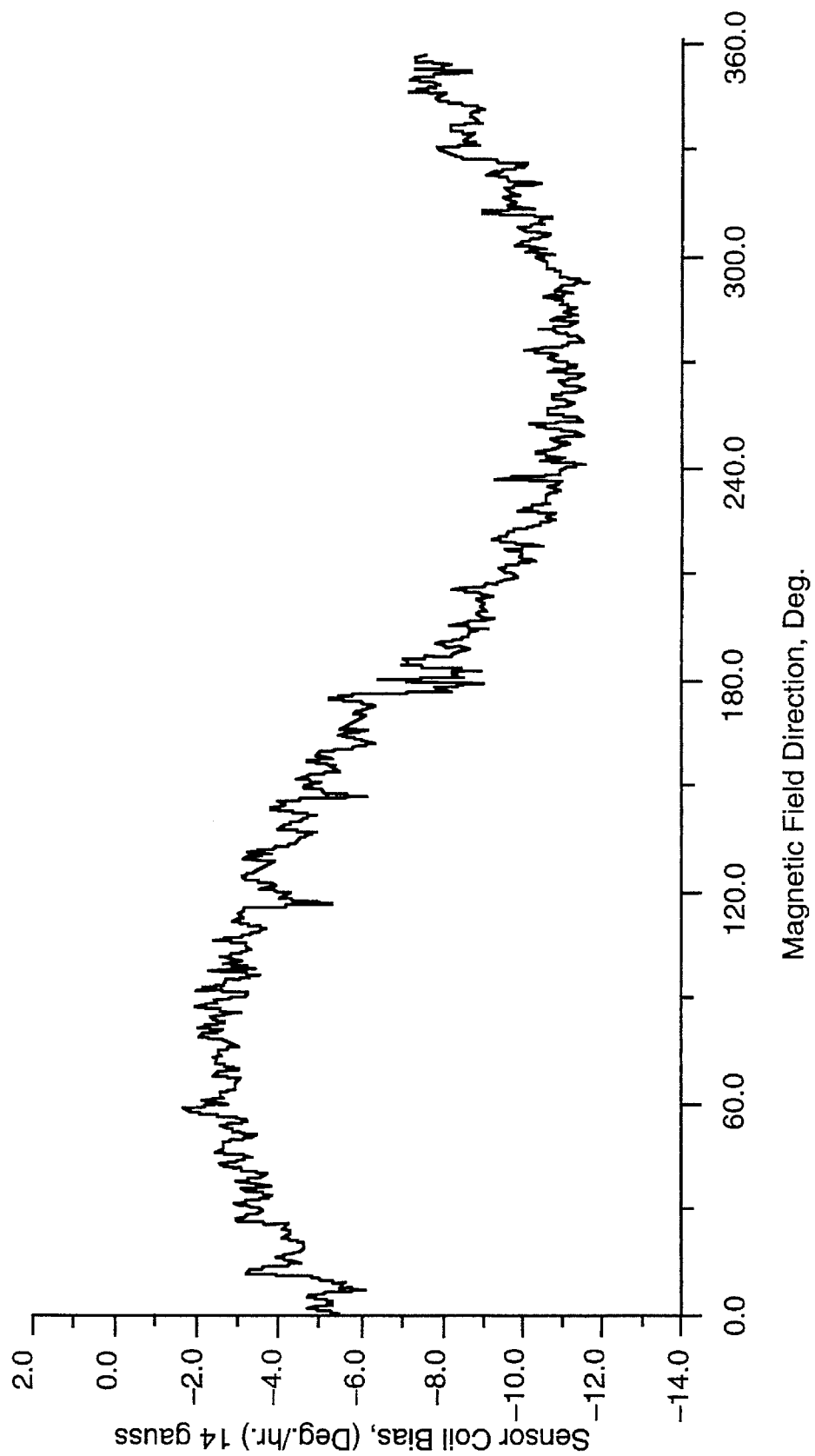
FIG. 2 illustrates graphical data showing sensor coil sensitivity to transverse magnetic fields.

Referring to FIG. 1, there is shown a schematic representation of a fiber optic rotation sensor 10 that includes apparatus for compensating for magnetic field sensitivity. The fiber optic rotation sensor 10 includes a sensing coil 12 that is formed of an optical fiber 14. The optical fiber that forms the sensing coil 12 preferably is a high birefringence fiber that has a pair of well defined principal axes of birefringence. The basic features of the fiber optic rotation sensor 10 are described only for the purpose of explaining the principles of the present invention. The basic features of the fiber optic rotation sensor do not form a part of the present invention.

FIGS. 4 and 5 illustrate a typical structure for the high birefringence polarization-maintaining optical fiber 14 that may be used to form the sensing coil 12. Referring to FIGS. 4 and 5, the polarization-maintaining optical fiber 14 has a core 16 and a cladding 18. The core 16 is formed of a glass substance having a refractive index $n_1$. The core 16 has a generally circular cross section. The cladding 18 has a refractive index $n_2$. The refractive indices of the polarization-maintaining optical fiber 14 are selected such that light is guided in the core 16 by internal reflection at the interface between the core 16 and cladding 18. The polarization-maintaining optical fiber 14 includes a pair of longitudinal rod-like members 19 and 20. The rod-like members 19 and 20 define principal axes of birefringence 21 and 22 and cooperate with the cladding 18 to produce birefringence in the core 16 such that the state of polarization of an optical signal input to the core 16 is preserved while the optical signal propagates in the polarization-maintaining optical fiber 14.

The polarization-maintaining fiber has polarization-dependent refractive indices. The speed of light in an optical fiber is $v=c/n$, where n is the refractive index. Because the refractive index depends upon the polarization, the polarization having the larger refractive index will have a smaller propagation speed in the fiber than the polarization having the smaller refractive index. An optical fiber that has different refractive index for the two possible polarizations is said to be birefringent. The two polarizations are therefore sometimes called the "fast" wave and the "slow" wave. The polarization of a linearly polarized light wave input to the fiber with the direction of polarization parallel to one of the principal axes of birefringence will be preserved, or maintained, as the wave propagates along the length of the fiber. The light wave in the fiber will thus be either fast wave or the slow wave. An optical signal having polarization components along both principal axes of birefringence will have a first portion coupled into the fast wave in the fiber and a second portion coupled into the slow wave.

It should be understood that the sensing coil 12 includes a plurality of turns as is customary in forming fiber optic rotation sensors. A pair of optical fiber leads 24 and 26 extend from the sensing coil 12.

An optical signal source 28 provides optical signals to an optical fiber 30, which guides the input optical signals to a fiber optic coupler 38. The fiber optic coupler 38 couples part of the signal from the optical signal source 28 into an optical fiber 36 and allows the remainder of the signal to remain in the optical fiber 30. The portion of the optical signal incident on the fiber optic coupler 36 from the optical signal source 28 that remains in the optical fiber 30 passes through the coupler 28 to a multifunction integrated optics chip (MIOC) 44.

The MIOC 44 may have various components (not shown) formed thereon for forming a full-featured fiber optic rotation sensor. The principles of the present invention may be explained if the MIOC includes three optical waveguides 46–48 that are joined at a Y-coupler 50 and the phase modulator 52.

The three optical waveguides 46–48 intersect to form the Y-coupler 50. The signal from the optical fiber 30 is coupled into the optical waveguide 46 at an edge of the MIOC 44. A phase modulator 52 is formed on the MIOC 44 adjacent the optical waveguide 46. After propagating past the phase modulator 52, the signal then is incident upon the Y-coupler 50, which divides the optical signal between the optical waveguides 47 and 48.

Fiber optic leads 54 and 56 are connected to the optical waveguides 47 and 48. Optical signals from the source are input to these leads 54 and 56, which are spliced to the fiber optic leads 24 and 26, respectively at splices 58 and 60. The optical signals input to the fiber optic leads 24 and 26 form the counterpropagating waves that are required in the fiber optic rotation sensor 10.

The counterpropagating waves traverse the fiber optic sensing coil 12 and then propagate back through the fiber optic leads 24, 26, 54 and 56 and the optical waveguides 47 and 48 to the Y-coupler 50. The counterpropagating waves combine in the Y-coupler 50 and interfere in accordance with well-known principles of optics. The combined waves then propagate through the optical waveguide 46 and the optical fiber 34 to the fiber optic coupler 38. The fiber optic coupler 38 couples part of the combined waves into an optical fiber 42, which guides the combined waves to a photodetector 62. The photodetector 62 produces an electrical signal that is processed by signal processing circuitry 64 to determine the rate of rotation of the fiber optic sensing coil 12 about its axis perpendicular to the plane of the page in FIG. 1.

The optical fiber leads 24, 26, 54, 56 all should be formed of high birefringence optical fiber such that each lead has a pair of well-defined principal axes of birefringence. Such fibers also have the characteristic of maintaining the polarization of optical signals input thereto.

The distance along the lead 54 from the multifunction integrated optics chip 52 to the splice 58 is a selected length $L_1$. The distance along the lead 56 from the multifunction integrated optics chip 52 to the splice 60 is a selected length $L_2$. The splice 58 should be formed such that the leads 24 and 54 have their principal axes of birefringence oriented at 45° angles to one another. Similarly, the axes of birefringence of the fiber optic leads 26 and 56 are oriented at a 45° angle relative to one another. This 45° orientation of the principal axes of birefringence of the pairs of fiber optic leads 24, 54 and 26, 56 and the multifunction integrated optics chip 52 combine to produce depolarized light in the fiber optic sensing coil 12. For example, suppose the multifunction integrated optics chip 52 causes the signal input to the fiber optic lead to have a fixed linear polarization $P_1$ that is all in the fast mode. When the polarization $P_1$ reaches the splice 58, polarization cross coupling will cause the fiber optic lead 24 to guide fast and slow modes of equal intensity to the coil 12. Therefore, the clockwise wave is depolarized. The counterclockwise wave is depolarized in the same manner at the splice 60.

Figure 3:
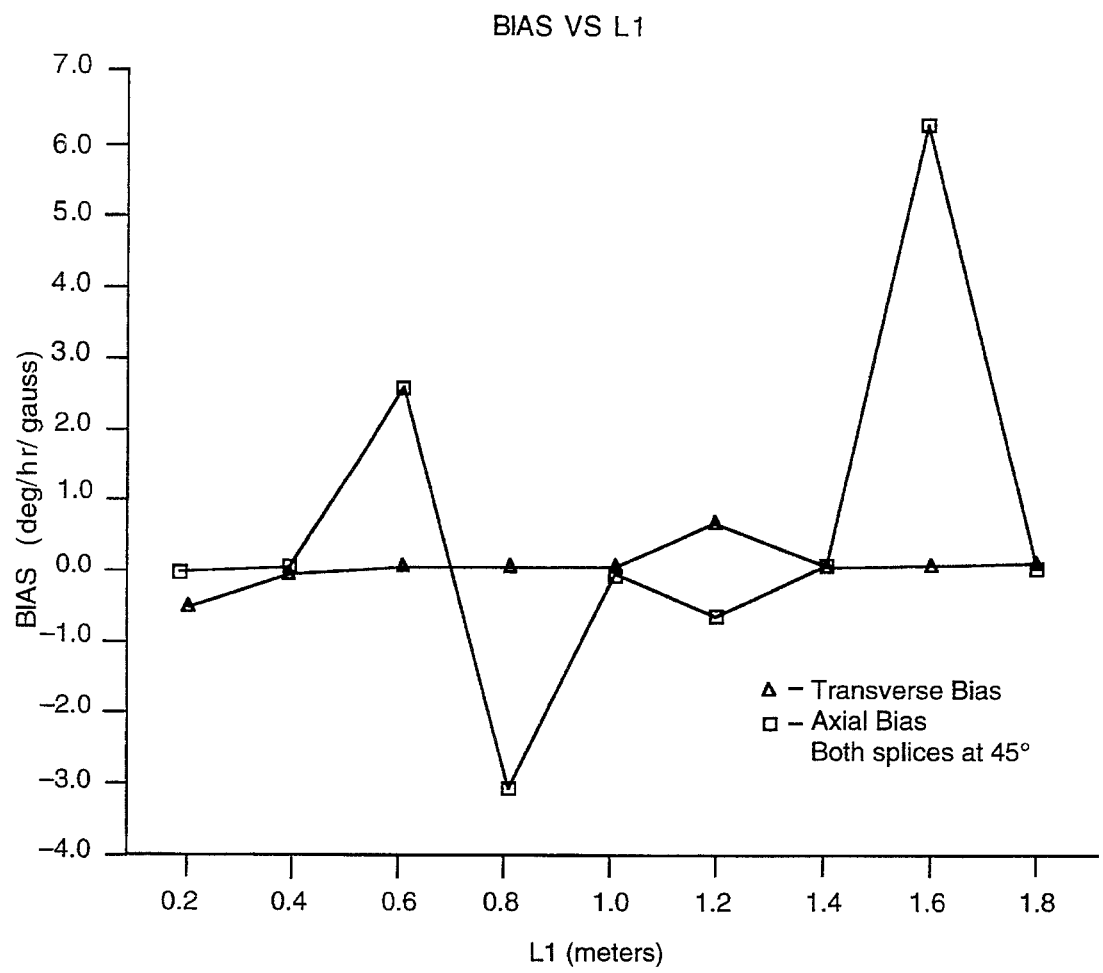
FIG. 3 graphically illustrates the analytical relationship between the magnetic field induced bias and the location of one of the splices between the optical fibers that connect the sensing coil to the multifunction integrated optics chip.

The optical fiber used to form the fiber optic sensing coil 12 has a twist that causes a phase shift in optical signals guided in the fiber optic sensing coil 12. The twist arises from the manner in which optical fiber is wound to form quadrupole coils and from the structure of the optical fiber, which typically is formed with a periodic twist caused by the rods 20 and 22. It has been found that the twist has a periodicity as shown in FIG. 3. The twist causes a phase difference between the counterpropagating waves even when the rotation rate is zero. It has been found that both transverse and axial magnetic field cause phase shifts in the counterpropagating waves. These phase shifts cause errors in the sensor output.

FIG. 2 graphically illustrates data taken in a measurement of the transverse magnetic field sensitivity of a typical fiber optic rotation sensor that does not include the 45° angle splices described. The variation is essentially sinusoidal.

A basic premise of the present invention is that fiber optic Lyot depolarizers can be fabricated integrally with the leads 26, 18, 20 and 22 that connect the multifunction integrated optics chip 18 to the sensing coil 12. The fiber-optic depolarizer consists of two sections of polarization maintaining fiber spliced together with their respective principal birefringence axes oriented at 45 degrees to one another. The accuracy to which this alignment is performed determines the quality of the depolarizer and ultimately the performance of the gyro fabricated with low-birefringence fiber.

The lengths $L_1$ and $L_2$ are selected such that transverse magnetic field sensitivity is suppressed. The 45° angle orientation of the principal axes of birefringence of the fibers at the splices causes part of the fast wave in the fiber 54 to couple into the slow mode in the fiber 24 and causes part of the slow wave in the fiber 54 to couple into the fast wave in the fiber 24. The lengths of the fibers 54 and 56 from the multifunction integrated optics chip are chosen such that the optical signals have phase changes in the distance $L_1$ that will be equal and opposite to the phase difference caused by the twist of the optical fiber in the fiber optic sensing coil 12.

It has been found that for an optical fiber coil having a radius R=1.77 cm and 1800 turns of fiber formed in twenty layers confirms that at least a two order of magnitude of suppression in magnetic sensitivity is achievable. It should be noted that the 45° angle splices reduce the sensitivity to transverse magnetic fields. The splices 58 and 60 increase the sensitivity to axial fields.

If the 45° angle splices are used to reduce sensitivity only to transverse magnetic fields, the apparatus of the present invention may used to measure the magnitude of an applied axial magnetic field. FIG. 5 illustrates the sensitivity of the fiber optic rotation sensor 10 to axial and transverse magnetic fields as a function of the location of the splice 58. The analytical results of FIG. 3 are for a 200 turn coil wound on a spool having a radius of 0.014 m. The distances of the 60 from the multifunction integrated optics chip 52 is $L_2$=0.4 m. The distance $L_1$ is the variable indicated on the horizontal axis in FIG. 3. Both splices 58 and 60 are formed with the principal axes of birefringence of the fibers at 45° angles. It can be seen that the sensitivity to transverse magnetic fields is small whereas the sensitivity to axial magnetic fields is relatively large. The conclusions reached from this set of experiments is that it is possible to reduce the transverse sensitivity utilizing 45 degrees splices. However, the axial sensitivity increases.

A test of a fiber optic rotation sensor with the leads spliced together at 45° angles as described above has demonstrated a significant suppression of transverse magnetic field sensitivity. A sensitivity of 1.789 deg/hr/gauss without the 45° angle splices was reduced to 0.065 deg/hr/gauss when the leads were spliced together with the principal axes of birefringence of the optical fiber leads being at angles of 45° relative to each other.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. Apparatus for reducing magnetic field sensitivity in a fiber optic rotation sensor that senses rotations about the axis of a sensing coil formed in a length of an optical fiber by detecting phase differences in a pair of counterpropagating waves in the sensing coil, the sensing coil being formed such that it has a sensitivity to external magnetic fields such that the Faraday effect causes a phase difference in the counterpropagating waves in the sensing coil, comprising:

an optical signal source;

a multifunction integrated optics chip having a first optical waveguide formed thereon, the first optical waveguide being arranged to receive optical signals from the optical signal source, the multifunction integrated optics chip having second and third optical waveguides formed thereon such that the first, second and third optical waveguides intersect to form a Y-coupler, the multifunction integrated optics chip further including a phase modulator formed therein to modulate the phase of waves in the first optical waveguide;

first and second fiber optic multifunction integrated optics chip leads formed of polarization-maintaining optical fiber and arranged to extend from the ends of the second and third optical waveguides, each of the first and second fiber optic multifunction integrated optics chip leads having two mutually perpendicular principal axes of birefringence, the first and second fiber optic multifunction integrated optics chip leads being arranged relative to the second and third optical waveguides, respectively, such that the linear polarization of optical signals output from the second and third optical waveguides are directed along one of the principal axes of birefringence of each of the first and second multifunction integrated optics chip leads;

first and second sensing coil leads of polarization-maintaining optical fiber extending from the sensing coil, each of the first and second sensing coil leads having two mutually perpendicular principal axes of birefringence;

a first splice formed between the first sensing coil lead and the first multifunction integrated optics chip lead, the first sensing coil lead and the first multifunction integrated optics chip lead being arranged such that their corresponding principal axes of birefringence are at angles of approximately 45° relative to one another such that the counterclockwise wave in the sensing coil is depolarized, the first multifunction integrated optics chip lead having a length $L_1$ between the multifunction integrated optics chip and the first splice such that a first selected phase change between polarization components occurs in optical waves that propagate the distance $L_1$ in the first multifunction integrated optics chip lead; and a second splice formed between the second sensing coil lead and the second multifunction integrated optics chip lead a distance $L_2$ from the multifunction integrated optics chip, the second sensing coil lead and the second multifunction integrated optics chip lead being arranged such that their corresponding principal axes of birefringence are at angles of approximately 45° relative to one another such that the counterclockwise wave in the sensing coil is depolarized.

2. Apparatus for reducing magnetic field sensitivity in a fiber optic rotation sensor that senses rotations about the axis of a sensing coil formed in a length of an optical fiber by detecting phase differences in a pair of counterpropagating waves in the sensing coil, the sensing coil being formed such that it has a sensitivity to external magnetic fields such that the Faraday effect causes a phase difference in the counterpropagating waves in the sensing coil, comprising:

first and second sensing coil leads of polarization-maintaining optical fiber extending from the sensing coil, each of the first and second sensing coil leads of polarization-maintaining optical fiber having two mutually perpendicular principal axes of birefringence;

an optical signal source for producing optical signals that form clockwise and counterclockwise propagating optical waves in the sensing coil;

a multifunction integrated optics chip connected between the optical signal source and the sensing coil, the multifunction integrated optics chip a multifunction integrated optics chip having a first optical waveguide formed thereon, the first optical waveguide being arranged to receive optical signals from the optical signal source, the multifunction integrated optics chip having second and third optical waveguides formed thereon such that the first, second and third optical waveguides intersect to form a Y-coupler, the multifunction integrated optics chip further including a phase modulator formed therein to modulate the phase of waves in the first optical waveguide;

first and second fiber optic multifunction integrated optics chip leads extending from the multifunction integrated optics chip, the first and second fiber optic multifunction integrated optics chip leads being formed of polarization-maintaining optical fiber and each of the first and second fiber optic multifunction integrated optics chip leads having two mutually perpendicular principal axes of birefringence, the first and second fiber optic multifunction integrated optics chip leads being arranged relative to the multifunction integrated optics chip such that the linear polarization of the optical signals output from the multifunction integrated optics chip is directed along one of the principal axes of birefringence of each of the first and second fiber optic multifunction integrated optics chip leads;

a first splice formed between the first sensing coil lead and the first multifunction integrated optics chip lead, the first sensing coil lead and the first multifunction integrated optics chip lead being arranged such that their corresponding principal axes of birefringence are at angles of approximately 45° relative to one another such that the counterclockwise wave in the sensing coil is depolarized, the first multifunction integrated optics chip lead having a length $L_1$ between the multifunction integrated optics chip and the first splice such that a first selected phase change between polarization components occurs in optical waves that propagate the distance $L_1$ in the first multifunction integrated optics chip lead, the phase change being opposite to the phase change caused by the Faraday effect on the counterpropagating waves in the sensing coil; and a second splice formed between the second sensing coil lead and the second multifunction integrated optics chip lead, the second sensing coil lead and the second multifunction integrated optics chip lead being arranged such that their corresponding principal axes of birefringence are at angles of approximately 45° relative to one another such that the counterclockwise wave in the sensing coil is depolarized.

3. A method for forming a fiber optic rotation sensor that senses rotations about the axis of a sensing coil formed in a length of an optical fiber by detecting phase differences in a pair of counterpropagating waves in the sensing coil, comprising the steps of:

forming the sensing coil to have first and second sensing coil leads of polarization-maintaining optical fiber extending therefrom;

producing clockwise and counterclockwise propagating optical waves in the sensing coil;

linearly polarizing the optical signals from the optical signal source;

connecting a with a multifunction integrated optics chip between the sensing coil and the multifunction integrated optics chip;

arranging first and second polarization-maintaining fiber optic multifunction integrated optics chip leads to extend from the multifunction integrated optics chip, arranging the first and second fiber polarization-maintaining optic multifunction integrated optics chip leads relative to the multifunction integrated optics chip such that the linear polarization of the optical signals output from the multifunction integrated optics chip is directed along one of the principal axes of birefringence of each of the first and second fiber optic multifunction integrated optics chip leads;

forming a first splice between the first sensing coil lead and the first multifunction integrated optics chip lead;

arranging the first sensing coil lead and the first multifunction integrated optics chip lead such that their corresponding principal axes of birefringence are at angles of approximately 45° relative to one another such that the counterclockwise wave in the sensing coil is depolarized;

forming the first multifunction integrated optics chip lead to have a length $L_1$ between the multifunction integrated optics chip and the first splice such that a first selected phase difference between polarization components occurs in optical waves that propagate the distance $L_1$ in the first multifunction integrated optics chip lead;

forming a second splice between the second sensing coil lead and the second multifunction integrated optics chip lead; and arranging the second sensing coil lead and the second multifunction integrated optics chip lead such that their corresponding principal axes of birefringence are at angles of approximately 45° relative to one another such that the counterclockwise wave in the sensing coil is depolarized.

4. A method for reducing magnetic field sensitivity in a fiber optic rotation sensor that senses rotations about the axis of a sensing coil formed in a length of an optical fiber by detecting phase differences in a pair of counterpropagating waves in the sensing coil, the sensing coil being formed such that it has a sensitivity to external magnetic fields such that the Faraday effect causes a phase difference in the counterpropagating waves in the sensing coil, comprising the steps of:

forming first and second sensing coil leads of polarization-maintaining optical fiber to extend from the sensing coil, each of the first and second sensing coil leads of polarization-maintaining optical fiber having two mutually perpendicular principal axes of birefringence;

producing optical signals that form clockwise and counterclockwise propagating optical waves in the sensing coil;

linearly polarizing the optical signals from the optical signal source;

connecting a multifunction integrated optics chip between the optical signal source and the sensing coil;

forming first and second fiber optic multifunction integrated optics chip leads to extend from the multifunction integrated optics chip;

forming the first and second fiber optic multifunction integrated optics chip leads of polarization-maintaining optical fiber such that each of the first and second fiber optic multifunction integrated optics chip leads have two mutually perpendicular principal axes of birefringence;

arranging the first and second fiber optic multifunction integrated optics chip leads relative to the multifunction integrated optics chip such that the linear polarization of the optical signals output from the multifunction integrated optics chip is directed along one of the principal axes of birefringence of each of the first and second fiber optic multifunction integrated optics chip leads;

forming a first splice between the first sensing coil lead and the first multifunction integrated optics chip lead; arranging the first sensing coil lead and the first multifunction integrated optics chip lead such that their corresponding principal axes of birefringence are at angles of approximately 45° relative to one another such that the counterclockwise wave in the sensing coil is depolarized;

forming the first multifunction integrated optics chip lead to have a length $L_1$ between the multifunction integrated optics chip and the first splice such that a first selected phase change between polarization components occurs in optical waves that propagate the distance $L_1$ in the first multifunction integrated optics chip lead, the phase change being opposite to the phase change caused by the Faraday effect on the counterpropagating waves in the sensing coil;

forming a second splice between the second sensing coil lead and the second multifunction integrated optics chip lead a distance $L_2$ from the multifunction integrated optics chip; and arranging the second sensing coil lead and the second multifunction integrated optics chip lead such that their corresponding principal axes of birefringence are at angles of approximately 45° relative to one another such that the counterclockwise wave in the sensing coil is depolarized.

5. Apparatus for producing a signal indicative of the strength of a magnetic field, comprising:

a sensing coil of optical fiber having a sensing axis;

apparatus for introducing counterpropagating optical signals in the sensing coil such that an external magnetic field on the sensing coil causes a phase difference between the counterpropagating optical signals as they traverse the sensing loop via the Faraday effect;

apparatus for reducing the sensitivity of the phase of the counterpropagating optical signals to magnetic fields transverse to the sensing coil, comprising:

first and second sensing coil leads of polarization-maintaining optical fiber extending from the sensing coil, each of the first and second sensing coil leads of polarization-maintaining optical fiber having two mutually perpendicular principal axes of birefringence;

a multifunction integrated optics chip connected between the optical signal source and the sensing coil, the multifunction integrated optics chip having a first optical waveguide formed thereon, the first optical waveguide being arranged to receive optical signals from the optical signal source, the multifunction integrated optics chip having second and third optical waveguides formed thereon such that the first, second and third optical waveguides intersect to form a Y-coupler, the multifunction integrated optics chip further including a phase modulator formed therein to modulate the phase of waves in the first optical waveguide;

fast and second fiber optic multifunction integrated optics chip leads extending from the multifunction integrated optics chip, the first and second fiber optic multifunction integrated optics chip leads being formed of polarization-maintaining optical fiber and each of the first and second fiber optic multifunction integrated optics chip leads having two mutually perpendicular principal axes of birefringence, the first and second fiber optic multifunction integrated optics chip leads being arranged relative to the multifunction integrated optics chip such that the linear polarization of the optical signals output from the multifunction integrated optics chip is directed along one of the principal axes of birefringence of each of the first and second fiber optic multifunction integrated optics chip leads;

a first splice formed between the first sensing coil lead and the first multifunction integrated optics chip lead, the first sensing coil lead and the first multifunction integrated optics chip lead being arranged such that their corresponding principal axes of birefringence are at angles of approximately 45° relative to one another such that the counterclockwise wave in the sensing coil is depolarized, the first multifunction integrated optics chip lead having a length $L_1$ between the multifunction integrated optics chip and the first splice such that a first selected phase change between polarization components occurs in optical waves that propagate the distance $L_1$ in the first multifunction integrated optics chip lead, the phase change being opposite to the phase change caused by the Faraday effect on the counterpropagating waves in the sensing coil; and a second splice formed between the second sensing coil lead and the second multifunction integrated optics chip lead, the second sensing coil lead and the second multifunction integrated optics chip lead being arranged such that their corresponding principal axes of birefringence are at angles of approximately 45° relative to one another such that the counterclockwise wave in the sensing coil is depolarized; and apparatus for monitoring interference patterns caused by combination of the counterpropagating optical signals to produce signals indicative of the strength of an external magnetic field directed along the axis of the sensing coil.

6. A method for producing a signal indicative of the strength of a magnetic field, comprising the steps of:

forming a sensing coil of optical fiber having a sensing axis;

introducing counterpropagating optical signals into the sensing coil such that an external magnetic field on the sensing coil causes a phase difference between the counterpropagating optical signals as they traverse the sensing loop via the Faraday effect;

reducing the sensitivity of the phase of the counterpropagating optical signals to magnetic fields transverse to the sensing coil by a process that includes the steps of:

forming first and second sensing coil leads of polarization-maintaining optical fiber to extend from the sensing coil, each of the first and second sensing coil leads of polarization-maintaining optical fiber having two mutually perpendicular principal axes of birefringence;

producing optical signals that form clockwise and counterclockwise propagating optical waves in the sensing coil;

linearly polarizing the optical signals from the optical signal source;

connecting a multifunction integrated optics chip between the optical signal source and the sensing coil;

forming first and second fiber optic multifunction integrated optics chip leads to extend from the multifunction integrated optics chip;

forming the first and second fiber optic multifunction integrated optics chip leads of polarization-maintaining optical fiber such that each of the first and second fiber optic multifunction integrated optics chip leads have two mutually perpendicular principal axes of birefringence;

arranging the first and second fiber optic multifunction integrated optics chip leads relative to the multifunction integrated optics chip such that the linear polarization of the optical signals output from the multifunction integrated optics chip is directed along one of the principal axes of birefringence of each of the first and second fiber optic multifunction integrated optics chip leads;

forming a first splice between the first sensing coil lead and the first multifunction integrated optics chip lead; arranging the first sensing coil lead and the first multifunction integrated optics chip lead such that their corresponding principal axes of birefringence are at angles of approximately 45° relative to one another such that the counterclockwise wave in the sensing coil is depolarized;

forming the first multifunction integrated optics chip lead to have a length $L_1$ between the multifunction integrated optics chip and the first splice such that a first selected phase change between polarization components occurs in optical waves that propagate the distance $L_1$ in the first multifunction integrated optics chip lead, the phase change being opposite to the phase change caused by the Faraday effect on the counterpropagating waves in the sensing coil;

forming a second splice between the second sensing coil lead and the second multifunction integrated optics chip lead a distance $L_2$ from the multifunction integrated optics chip; and arranging the second sensing coil lead and the second multifunction integrated optics chip lead such that their corresponding principal axes of birefringence are at angles of approximately 45° relative to one another such that the counterclockwise wave in the sensing coil is depolarized;

combining the counterpropagating optical signals to produce an interference pattern; and detecting the interference pattern to produce signals indicative of the strength of an external magnetic field directed along the axis of the sensing coil.

* * * * *